INVENTOR

FRANZ GOTTFRIED REUTER

INVENTOR
FRANZ GOTTFRIED REUTER

United States Patent Office

3,523,101
Patented Aug. 4, 1970

3,523,101
THERMOPLASTIC POLYCAPROLACTONE POLYURETHANES
Franz Gottfried Reuter, Hannover, Germany, assignor to Elastomer AG, Chur, Switzerland, a corporation of Switzerland
Continuation of application Ser. No. 814,538, Apr. 9, 1969, which is a continuation-in-part of application Ser. No. 764,519, Oct. 2, 1968, which in turn is a continuation-in-part of applications Ser. No. 545,526, Apr. 21, 1966, and Ser. No. 570,061, Aug. 3, 1966; said application Ser. No. 814,538 is also a continuation-in-part of application Ser. No. 701,218, Jan. 29, 1968, and also in turn is a continuation-in-part of application Ser. No. 722,514, Mar. 18, 1968, which are the continuations of application Ser. No. 701,219, Jan. 29, 1968, and is also in turn is a continuation-in-part of application Ser. No. 710,739, Mar. 6, 1968, which is a continuation-in-part of applications Ser. No. 701,218 and Ser. No. 701,219, both of Jan. 29, 1968. This application Aug. 14, 1969, Ser. No. 850,065
Claims priority, application Germany, May 15, 1965, 1,570,508; Aug. 30, 1965, E 29,996; Jan. 30, 1967, 1,720,575; Mar. 31, 1967, 1,720,581
Int. Cl. C08g 22/10
U.S. Cl. 260—47                                   22 Claims

ABSTRACT OF THE DISCLOSURE

A thermoplastic polyurethane useful in making microprous leather substitutes, shoe lifts, bearings, and the like prepared from a hydroxyl polycaprolactone, a low molecular weight glycol and an organic diisocyanate is provided.

---

This invention relates generally to thermoplastic polyurethanes and more particularly to a novel polyurethane processable by thermoplastic methods having improved physical properties and to a method for making it. This application is a continuation of my copending application Ser. No. 814,538 filed Apr. 9, 1969 and now abandoned which is a continuation-in-part of my application Ser. No. 764,519, now abandoned, filed Oct. 2, 1968 as a continuation-in-part of my applications Ser. No. 545,526 filed Apr. 21, 1966, now abandoned, and Ser. No. 570,061 filed Aug. 3, 1966, now abandoned. Application Ser. No. 814,538 is also a continuation-in-part of my copending applications Ser. No. 701,218 filed Jan. 29, 1968 and now abandoned; Ser. No. 722,514 filed Mar. 18, 1968 and now abandoned as a continuation-in-part of application Ser. No. 701,219 filed Jan. 29, 1968 and now abandoned, and Ser. No. 710,739 filed Mar. 6, 1968 and now abandoned as a continuation-in-part of applications Ser. Nos. 701,218 and 701,219.

It has been proposed heretofore to prepare polyurethanes which are thermoplastically processable. For example, one process is disclosed in U.S. Pat. 3,214,411 wherein a polyester prepared by esterification of a dicarboxylic acid and a glycol and a chain extender are reacted with an organic diisocyanate. The product thus obtained has the disadvantage of poor hydrolysis resistance and low mechanical heat stability. Furthermore, the physical characteristics of these products change in storage at room temperature and even more at temperatures above 150° C. and below −30° C. so the thermoplastic polyurethanes have not been widely accepted particularly where stability at temperatures below −30° C. as well as above 100° C. is required. Additionally, many of the products of such processes do not have a hardness above Shore D 65°.

It has also been proposed to react polycaprolactones and chain extenders with organic polyisocyanates to make gum stocks suitable for processing on a rubber mill, cellular polyurethanes and cast polyurethane elastomers in U.S. Pats. Nos. 2,933,477; 2,933,478; 3,186,971 and 3,240,730. However, none of the products of these disclosed processes can be processed by thermoplastic methods such as extrusion.

It is therefore an object of this invention to provide a polyurethane devoid of the foregoing disadvantages. Another object of the invention is to provide a process for making a polyurethane which after shaping by thermoplastic processes has improved hydrolysis resistance. Still another object of the invention is to provide a novel thermoplastic polyurethane which can be thermoplastically processed to provide an end product combining improved hydrolysis resistance with greater mechanical heat stability. Another object of the invention is to provide a polyester polyurethane which when thermoplastically processed has improved mechanical heat stability and hydrolysis resistance over those prepared from a polyester which has been prepared by esterification of a polycarboxylic acid or those polyurethanes prepared from poly(alkylene)ether polyols. Still another object of the invention is to provide a thermoplastic polyurethane which has improved storage stability. Still another object of the invention is to provide a method for making a thermoplastic polyurethane which is soluble in polar solvents and forms a solution of relatively low viscosity in such solvents. A further object of the invention is to provide a thermoplastic polyurethane which is characterized by thermal stability at temperatures above 100° C. and below −30° C. A more specific object of the invention is to provide a method for reacting a hydroxyl polycaprolactone and a chain extender with an organic polyisocyanate to make a solid thermoplastic polyurethane which retains its physical characteristics over extended storage periods and produces a product which when thermoplastically processed has a hardness above Shore D 60°.

Other objects will become apparent from the following description with reference to the accompanying drawing in which FIGS. 1 and 2 illustrate the logarithmic decrement and shear modulus curves of prior art polyurethanes;

Figure 1:
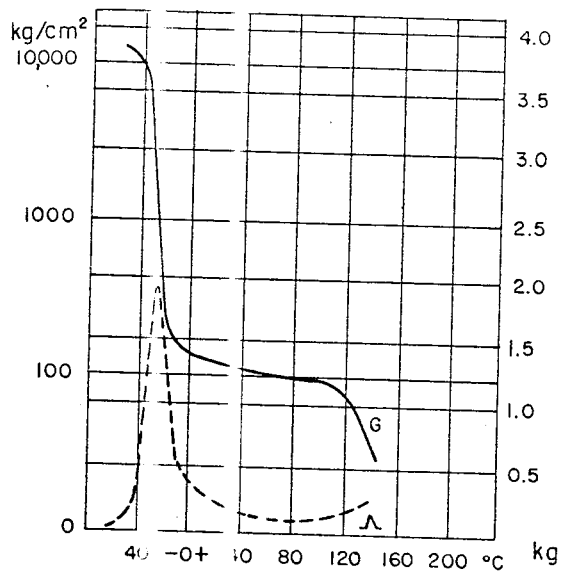

The foregoing objects and others which will become apparent from the following description are accomplished in accordance with this invention, generally speaking, by providing a thermoplastically processable polyurethane prepared by a process wherein a substantially linear hydroxyl polycaprolactone, preferably one having a molecular weight above about 800 and not substantially above about 3000, an organic diisocyanate and a glycol chain extender having a molecular weight below about 560 are reacted at an elevated temperature until a solid polyurethane which is still thermoplastically processable is formed.

The polycaprolactone and chain extender may be mixed with the diisocyanate substantially simultaneously or the polycaprolactone may be reacted first with the diisocyanate and the chain extender thereafter added.

A preferred embodiment of the invention provides a product which is the reaction product of a substantially linear hydroxyl polycaprolactone, a glycol having the formula

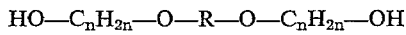
HO—$C_nH_{2n}$—O—R—O—$C_nH_{2n}$—OH wherein R is phenylene or naphthylene, $n$ is an integer of from 1 to 12, and an organic diisocyanate. The preferred compound of the above formula is hydroquinone diglycol ether but the alkylene radicals in the formula can be propylene, butylene, hexylene or the like. The position of the aliphatic radicals on R may be ortho, para or meta.

Any other suitable low molecular weight chain extender having a molecular weight of below about 560, preferably below 500, may be used instead of or along with the above preferred ones such as, for example, 1,4-butanediol, 1,3 - butanediol, 1,6-hexanediol, 1,12-dodecanediol, pentanediol, diethylene glycol and the like, or mixtures thereof. Any suitable aromatic, aliphatic or cycloaliphatic diisocyanate can be used such as, for example, 1,6-hexamethylene diisocyanate, 1,4-diethylbenzyl-beta, beta'-diisocyanate, hexahydro-para-phenylene-diisocyanate, 2,4- or 2,6-toluylene diisocyanate, 80% 2,4- and 20% 2,6-toluylene diisocyanate, and the like, or mixtures thereof, but 1,6-hexamethylene diisocyanate and diphenylmethane-4,4'-diisocyanate are preferred. A urethane diisocyanate such as the reaction product of two mols 1,6-hexamethylene diisocyanate and the one mol ethylene glycol may be used.

In one of the preferred embodiments of the invention a hydroxyl polycaprolactone having a molecular weight of from about 1000 to about 3000 and a hydroxyl number of from about 37 to about 112 and a low molecular weight hydroxyl terminated chain extender are mixed substantially simultaneously with solid diphenylmethane-4,4'-diisocyanate and the resulting mixture is chemically reacted to form a substantially non-porous solid thermoplastic polyurethane. The solid diphenylmethane-4,4'-diisocyanate is in the form of crystals or a powder and is mixed as particles thereof with the polycaprolactone and chain extender. A uniform mixture is obtained by stirring. Best results are obtained by permitting the mixture containing the polycaprolactone and chain extender to react simultaneously with the diphenylmethane-4,4'-diisocyanate briefly or until a rather viscous liquid is formed and then transferring this still flowable product to a heated surface where it remains in a thin substantially bubble-free layer until it solidifies but is still thermoplastically processable.

In an embodiment of the invention wherein a thermoplastic polyurethane is prepared which has particularly good stability at temperatures of above 100° C. and below —50° C. a substantially linear hydroxyl polycaprolactone having a molecular weight of from about 1000 to about 3000 and a hydroxyl number of from about 37 to about 112 and an arylene bis-(hydroxyl alkyleneether) chain extender of the above formula are mixed at substantially the same time with 1,6-hexamethylene diisocyanate and the resulting mixture is chemically reacted at from about 80° C. to about 160° C. to form a substantially non-porous solid thermoplastic polyurethane. In this embodiment, the hydroxyl polycaprolactone and chain extender may be mixed together and the resulting mixture mixed with the 1,6-hexamethylene diisocyanate or the three components may be brought together separately, provided the polycaprolactone and chain extender are both mixed with the diisocyanate before either one has reacted to any appreciable extent therewith.

In accordance with an embodiment of the invention which produces a product having a hardness of Shore D 60° or higher, a substantially linear hydroxyl polycaprolactone having a molecular weight of from about 1000 to about 3000 and a hydroxyl number of from about 37 to about 112 and a low molecular weight glycol chain extender are mixed substantially simultaneously with solid diphenylmethane-4,4'-diisocyanate or 1,6-hexamethylene diisocyanate and the resulting mixture is chemically reacted to form a substantially non-porous solid thermoplastic polyurethane. In this embodiment, the molar ratio of isocyanato groups to total hydroxyl groups of the polycaprolactone and glycol must be between about 1.06 and 1.09 —NCO per —OH. A ratio of from about 1.1 to about 1.3 —NCO per —OH of the glycol chain extender should be used. Preferably, the temperature of the mixture of polycaprolactone, chain extender and diisocyanate is from about 80° C. to about 160° C. and the temperature of the surface on which it is poured is from about 140° C. to about 160° C.

In preparing the polyurethane in accordance with the various embodiments of the invention, a reaction mixture is prepared of the proper proportions of hydroxyl polycaprolactone, chain extender and diisocyanate and the partially reacted mixture is poured while still liquid as a thin film over a heated surface such as a tray, hot plate or conveyor belt. The temperature of the heated surface should be, preferably, about the same as that of the reaction mixture. The film is heated about 5–10 minutes or until it has solidified but is removed from the heated surface and cooled below reaction temperature before it is no longer thermoplastically processable. The product is usually cut or broken into strips or pieces and later granulated. The chemical reaction is exothermic. Preferably, the temperature of the reaction mixture prior to pouring of the film on the heated surface is maintained within the range of from about 80° C. to about 160° C. However, in some embodiments the temperature of the liquid reaction mixture and of the heated surface should preferably be maintained between about 100° C. and 130° C. When solid diphenylmethane-4,4'-diisocyanate is used the temperature of the reaction mixture is preferably about 85° C. A wax or silicone mold release on the tray or the like facilitates removal of the solid thermoplastic polyurethane.

The components of the reaction mixture can be stirred together by hand or mixed in any suitable mixing apparatus including, for example, the apparatus disclosed in U.S. Reissue Pat. No. 24,514. The addition of a carbodiimide stabilizes the polycaprolactone polyester against hydrolytic degradation so it is recommended that one be included. Examples of suitable carbodiimides are disclosed in U.S. Pat. No. 3,193,524 and include diisopropylcarbodiimide, dicyclohexylcarbodiimide, and the like. Suitable diisocyanates are disclosed in U.S. 2,933,477.

Broadly speaking, the ratio of isocyanato groups to hydroxyl groups in the reaction mixture can vary from slightly below 1 to 1 to about 2 to 1, preferably from about 0.9 to about 1.1 —NCO per —OH in the reaction mixture. In some embodiments a narrower range is required to obtain certain properties. For example, in order to obtain a hardness of Shore D 60° or higher, either 1,6-hexamethylene diisocyanate or solid diphenylmethane-4,4'-diisocyanate should be used and the ratio should be from about 1.06 to about 1.09 —NCO per total —OH and from about 1.1 to about 1.3 —NCO per —OH group of the glycol chain extender.

The product of this invention after thermoplastic processing has a hardness of from about Shore A 70° to above Shore D 60° depending upon the particular components and ratios thereof used. The polyurethane can be plasticized, dyed or colored or filled with a suitable filler such as, for example, talc, barium sulfate, or the like.

The particle size of the solid diphenylmethane-4,4'-diisocyanate should be as small as practical to facilitate mixing. The preferred particle size is from about 0.05 inch to about 0.5 inch. The particles are granular of irregular shape usually having a scaly appearance.

The polycaprolactones suitable for this invention are all polycaprolactone polyesters having terminal alcoholic hydroxyl groups including those disclosed in U.S. Pats.

Nos. 2,933,477 and 3,169,945 having a substantially linear molecular structure and a molecular weight above about 800 and preferably between about 1000 and about 3000. Preferably, the polycaprolactone polyester is one which has been prepared from a lactone with a glycol as the initiator. Diethylene glycol is the preferred initiator. Any other suitable glycol such as, for example, 1,4-butanediol, ethylene glycol and the like, including those disclosed as an initiator in U.S. Pats. 2,933,477 and 3,169,945, may be used. Although the various lactones disclosed in U.S. Pats. 2,933,477 and 3,169,945 may be used to form the polycaprolactone, an epsilon-caprolactone has been found particularly advantageous and is preferred. The epsilon caprolactone or other lactone used to make the polycaprolactone polyester may be unsubstituted or substituted with alkyl, alkoxy, cycloalkoxy or single ring aromatic hydrocarbon radicals as disclosed in U.S. Pat. No. 2,933,477 provided the substitution does not contain hydrogen atoms reactive with an —NCO group and the total number of carbon atoms on the substituents is not more than 12. Unsubstituted lactones or lower alkyl substituted lactones are preferred.

The product obtained after processing of the thermoplastic polyurethane has exceptionally good hydrolysis resistance particularly if one or more of the reactants contains a hexamethylene or dodecylene grouping. The hexamethylene or dodecylene grouping can be incorporated in the reaction mixture as the diisocyanate or the chain extender. The elasticity, tensile strength, tear strength and abrasion resistance are also very good. The product obtained when the diisocyanate is diphenylmethane-4,4'-diisocyanate has the best tensile strength and tear strength while a product having especially good temperature processability and elasticity is obtained when the diisocyanate is an aliphatic or cycloaliphatic diisocyanate.

As pointed out hereinbefore, it has been discovered that a thermoplastic polyurethane having a hardness above Shore D 60° combined with improved storage stability characteristics can be prepared provided a hydroxyl polycaprolactone having a molecular weight of from about 1000 to about 3000, a glycol chain extender and diphenylmethane - 4,4' - diisocyanate or 1,6-hexamethylene diisocyanate, or mixtures thereof, are mixed together and reacted within the critical range of ratios of isocyanato to total hydroxyl of 1.06 to 1.09 —NCO per —OH. If the polycaprolactone has a molecular weight of about 2000, the ratio of polycaprolactone and glycol (1,4-butanediol or the like) should be from about 5 to 11 mols glycol per mol polycaprolactone in this embodiment. The ratio of diisocyanate to polycaprolactone (mol. wt. 2000) should be from about 7 to 13 mol. diisocyanate per mol. polycaprolactone. With substantial changes in molecular weight of the polycaprolactone or glycol, the ratio of polycaprolactone to glycol, diisocyanate to glycol and diisocyanate to polycaprolactone will vary but the total hydroxyl to isocyanate group remains the same regardless of molecular weight as long as the molecular weight of the polycaprolactone is within the range of about 1000 to about 3000. The thermoplastic polyurethane provided by this embodiment has a molecular structure which combines stability against change in storage with a hardness greater than that obtained from a polycaprolactone and liquid diphenylmethane-4,4'-diisocyanate.

Figure 6:
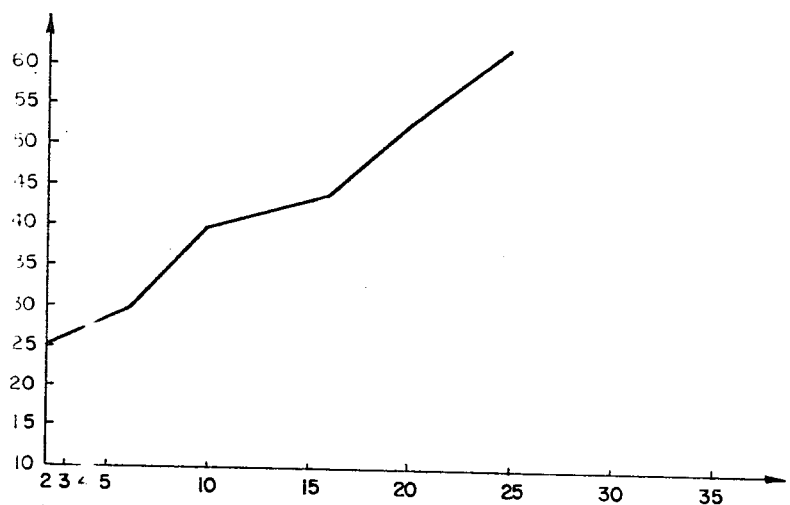
FIG. 6 illustrates the effect of storage on a prior art thermoplastic polyurethane.

One method of determining the stability of a polyurethane against change in molecular structure is to prepare a solution in a polar solvent therefor and determine the viscosity of the solution. Such a method has been used to compare the stability of the product provided by this invention with products of the prior art and the results are plotted graphically in the accompanying drawing. A solution of 10 g. of a granular polyurethane prepared from an adipic acid-ethylene glycol polyester, 1,4-butanediol and liquid diphenylmethane-4,4'-diisocyanate in 90 g. dimethyl formamide was prepared at 50° C. and cooled. The viscosity was measured at room temperature (about 20° C.) after one day storage. Additional solutions were prepared from granules at intervals during 25 days' storage. The viscosity values obtained are shown in FIG. 6 indicating that the solution became increasingly more viscous during the storage period. The polyurethane was insoluble after 25 days. The increased viscosity indicates that the thermoplastic properties of the product changed as the product aged in storage.

Figure 7:
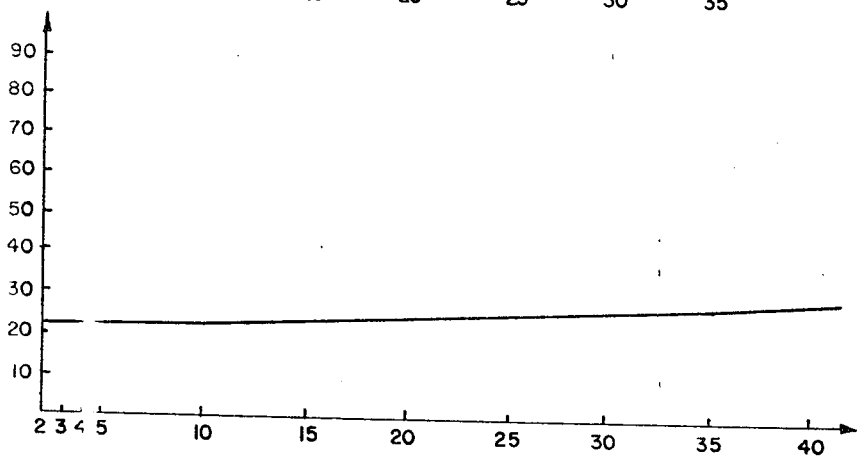
FIG. 7 illustrates the effect of storage on a preferred embodiment of this invention.

A series of solutions of 10 g. of the product of Example 14 described hereinafter dissolved at 50° C. in 90 g. dimethyl formamide was prepared at intervals during storage and the viscosity of solutions of the stored granules had changed only from about 22 cps. to about 30 cps. in over 40 days. While the viscosity of the solutions used to obtain the results of FIG. 6 increased steadily and in 25 days was 2½ times the initial viscosity of 25 centipoises (cps.), the viscosity of the solutions of the product of the invention, as shown in FIG. 7, had increased only about 15 percent after 25 days and only about 35 percent after 40 days' storage.

Figure 8:
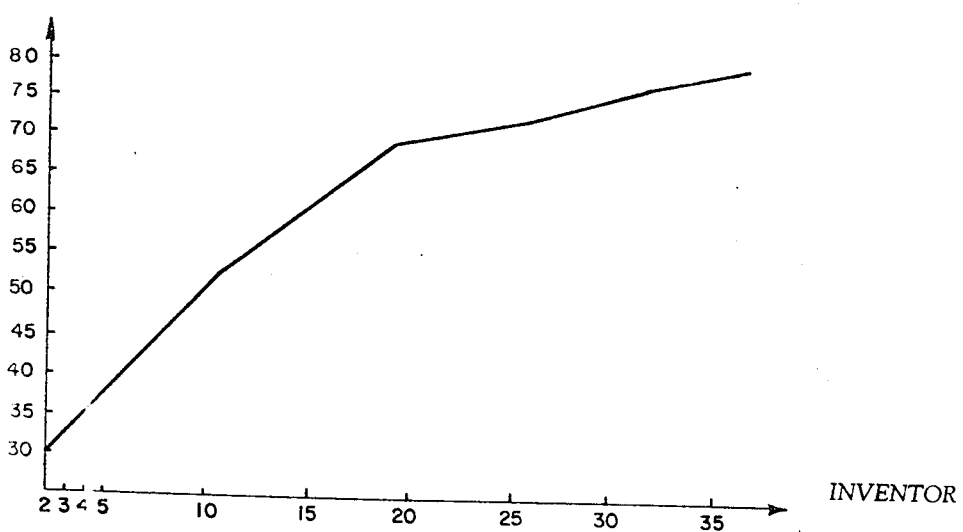
FIG. 8 illustrates the effect of storage on a thermoplastic polyurethane prepared from components similar chemically to those used in the embodiment of FIG. 7 but employing liquid diphenylmethane-4,4′-diisocyanate.

In order to demonstrate the effect of mixing the diphenylmethane-4,4'-diisocyanate with the polycaprolactone polyester as solid particles instead of in the molten state as in the prior art processes, a series of solutions were prepared this time using a product similar to that of Example 14 except the diphenylmethane - 4,4' - diisocyanate was added as a liquid. The change in viscosity during storage is shown in FIG. 8. The product was still soluble after 40 days and thus thermoplastically processable but the viscosity had increased from 30 centipoises to 80 centipoises during the 40 days, a change of 165 percent. The viscosity of each of the foregoing solutions was determined at about 20° C. with a rotating viscosimeter.

It should be noted that the product prepared with solid diphenylmethane-4,4'-diisocyanate is not only soluble in polar solvents at the time it is prepared but remains soluble even after lengthy storage periods which is another important advantage over prior art thermoplastic polyurethane. Moreover, the initial viscosity of solutions with such solvent (i.e. before any appreciable storage period) is lower than that of solutions of other thermoplastic polyurethanes in the same solvents. Polar solvents are dimethylformamide, dimethyl acetamide, dimethylpropionamide and the like. Additional polar solvents suitable for use herein are disclosed in U.S. Pat. 2,755,266.

One of the most important advantages of the product prepared from solid diphenylmethane-4,4'-diisocyanate is that it is adaptable for use in making microporous leather substitutes. Of course, if good storage stability is not required, liquid diphenylmethane-4,4'-diisocyanate can be used. The prior art thermoplastic processable polyurethanes are not acceptable for this purpose because of their poor stability in storage. The various embodiments provided by the invention can also be used in making shoe lifts, bearings, and the like.

In the following examples the parts are by weight and the diisocyanate is liquid unless otherwise specified.

EXAMPLE 1

1,000 parts of a polycaprolactone have a molecular weight of 2,000 and a hydroxyl number of 54 were dehydrated, mixed at 150° C. with 50 parts 1,4-butanediol and then reacted with 210 parts by weight 1,6-hexamethylenediisocyanate. The reaction product was poured into heated shallow trays while still in the liquid state and allowed to stand for 10 minutes at 150° C. before cooling to room temperature. After storage for 48 hours at room temperature, the reaction product could be granulated and subsequently processed to the finished article on the conventional kind of injection molder or in an extruder. The articles were then heated for 3 days at 80° C. or stored for six weeks at room temperature to age the polyurethane and produce its optimum properties.

The physical properties of the product obtained in this manner were as follows:

Hardness Shore A—78°.
Hardness Shore D—26°
Tensile strength—460 kp./cm.$^2$
Elongation at break—850%
Shock elasticity—62%
Resistance to tear progagation—29 kp./cm.
Abrasion loss—40 mm.$^3$
Deformation under load: 70° C., 30 min. after removal of load—36%
Hydrolysis test: (storage for several days under water at 80° C.)
After 8 days, tensile strength—450 kp./cm.$^2$
Light fastness: no yellowing after exposure to direct sunlight for several weeks.

EXAMPLE 2

1,000 parts by weight of a dehydrated polycaprolactone having a molecular weight of 1,000 and a hydroxyl number of 101 were mixed at 150° C. with 245 parts by weight of 1,4-butanediol and the mixture was reacted with 650 parts of 1,6-hexamethylene-diisocyanate. The reaction product was further processed and stored in the manner described in Example 1.

The thermoplastically processed product obtained had the following properties:

Hardness Shore D—60°
Tensile strength—410 kp./cm.$^2$
Elongation at break—660%
Shock elasticity—51%
Resistance to tear propagation—41 kp./cm.
Abrasion loss—45 mm.$^3$
Deformation under load: 70° C.,
30 min. after removal of load (compression set)—30%
Hydrolysis test: (storage for several days under water at 80° C.)
After 8 days, tensile strength—390 kp./cm.$^2$

EXAMPLE 3

1,000 parts by weight of a dehydrated polycaprolactone having a hydroxyl number of 54 and a molecular weight of 2,000 were reacted at 110° C. with 600 parts by weight of diphenylmethane-4,4'-diisocyanate. 363 parts of 1,12-dodecanediol were mixed with the polyesterurethane at a temperature of 120° C. while stirring well. The reaction product was further processed and stored in the manner described in Example 1.

The thermoplastically processed products obtained by the process described in this example had the following physical properties:

Hardness Shore A—92°
Hardness Shore D—35°
Tensile strength—480 kp./cm.$^2$
Elongation at break—630%
Resistance to tear propagation (streifen)—38 kp./cm.
Resistance to tear propagation (Graves)—79 kp./cm.
Shock elasticity—36%
Abrasion loss—55 mm.$^3$
Deformation under load: 24 hours at 70° C., 30 min. after removal of load—35%
Resistance to cold (Roelig)— −30 to −35° C.
Hydrolysis test: (storage for several days under water at 80° C.)
After 3 days, strength: 10% reduction; elongation: 12% reduction
After 32 days, strength: 10% reduction; elongation: 8% increase

EXAMPLE 4

1,000 parts by weight of a linear hydroxylpolycaprolactone of molecular weight 2,000 and of hydroxyl number 56 were reacted in the anhydrous state at 110° C. with 450 parts by weight of diphenylmethane-4,4'-diisocyanate. A few seconds thereafter 189 parts by weight of hydroquinone diglycol ether and 3 parts by weight of trimethylolpropane were added to the reaction product at 100° C. The reaction mixture, while still liquid was cast on to heated metal sheets and left on these for 10 minutes at 150° C. After 48 hours storage at room temperature the reaction product could be granulated and processed on the usual injection molding machines, extruders or calenders to give the finished article. The finished articles achieved their optimum properties after 3 days annealing at 80° C. or by simply storing for 6 weeks at room temperature.

Test:
  Density—1.18 g./cm.$^3$
  Shore A—92°
  Shore D—36°
  Tensile strength—483 kp./cm.$^2$
  Modulus at 100%—78 kp./cm.$^2$
  Modulus at 300%—162 kp./cm.$^2$
  Extension—470%
  Impact elasticity—37%
  Tear propagation resistance (DIN 53507)—30 kp./cm.
  Tear propagation resistance (DIN 53515)—60 kp./cm.
  Abrasion—56 mm.$^3$
  Pressure deformation at room temperature—10.2%
  Pressure deformation at 70° C.—24.0%

EXAMPLE 5

1,000 parts of a dehydrated linear hydroxylpolycaprolactone of molecular weight 3,000 and hydroxyl number 37 and 165 parts hydroquinone diglycol ether were reacted at about 120° C. with 240 parts by weight of diphenylmethane-4,4'-diisocyanate. The reaction mixture was further processed as described in Example 4.

The thermoplastically processed products produced according to this example had the following properties:

Test:
  Density—1.16 g./cm.$^3$
  Shore A—95°
  Shore D—40°
  Tensile strength—352 kp./cm.$^2$
  Modulus at 100%—50 kp./cm.$^2$
  Modulus at 300%—118 kp./cm.$^2$
  Extension—520%
  Impact elasticity—40%
  Tear propagation resistant (DIN 53507)—24 kp./cm.
  Tear propagation resistance (DIN 53515)—49 kp./cm.
  Abrasion—43 mm.$^3$
  Pressure deformation at room temperature—17.5%
  Pressure deformation at 70° C.—45.0%

EXAMPLE 6

1,000 parts by weight of a linear hydroxylpolycaprolactone of molecular weight 1,000 and hydroxyl number 128 were mixed in the anhydrous state, at 150° C., with 189 parts by weight of hydroquinone diglycol ether and 3 parts by weight of trimethylolpropane, and immediately thereafter the mixture was reacted with 610 parts by weight of diphenylmethane-4,4'-diisocyanate. The reaction mixture was further processed as in Example 4.

The properties of the finished products obtained were as follows:

Test:
  Density—1.19 g./cm.$^2$
  Shore A—93°
  Shore D—40°
  Tensile strength—518 kp./cm.$^2$
  Modulus at 100%—108 kp./cm.$^2$
  Modulus at 300%—252 kp./cm.$^2$
  Extension—430%

Test (Continued):
 Impact elasticity—20%
 Tear propagation resistance (DIN 53507—37 kp./cm.
 Tear propagation resistance (DIN 53515)—82 kp./cm.
 Abrasion—68 mm.³
 Pressure deformation at room temperature—15.0%
 Pressure deformation at 70 C.—28.1%

Figure 2:
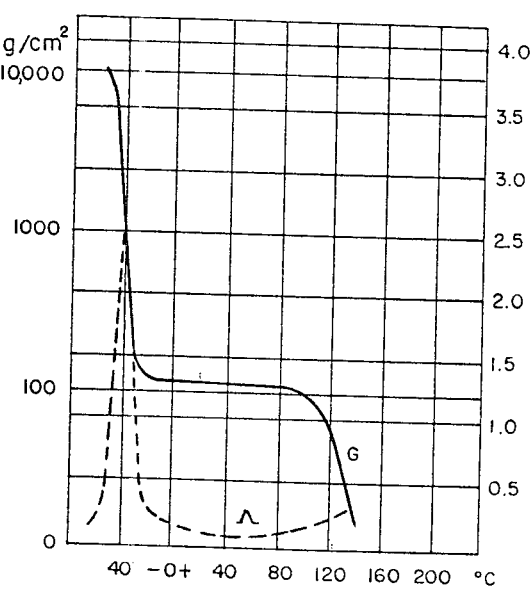
Figure 3:
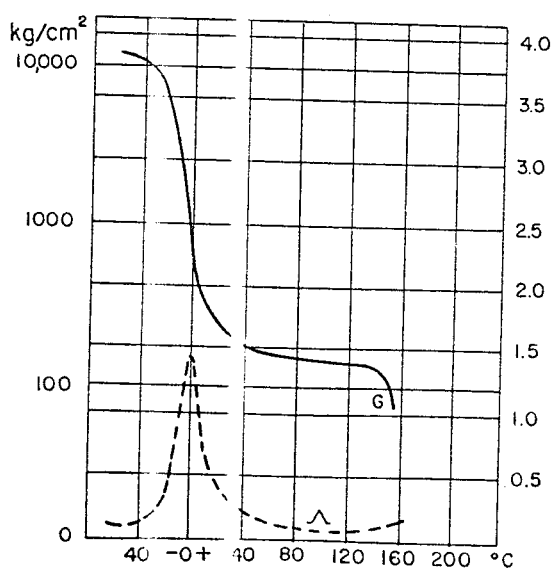
FIG. 3 illustrates the logarithmic decrement and shear modulus of an embodiment of this invention.

The curves of FIGS. 1, 2 and 3 illustrate the contrasting results obtained when the logarithmic decrement and shear modulus of prior art polyurethanes are compared with one of the embodiments of this invention. The upper curve of FIG. 1 begins to fall rapidly at about 120° C. Likewise, the shear modulus curve near the bottom of FIG. 1 rises rapidly beginning at about 120° C. In FIG. 2, the abrupt changes in the two curves begin at about 110° C. In FIG. 3 the abrupt change in slope of the curves begins at about 150° C. indicating a product prepared in accordance with Example 4 is stable at temperatures of up to about 150° C. whereas the conventional polyester polyurethanes prepared from adipic acid-ethylene glycol polyesters are not stable above temperatures of about 120° C.

The mechanical heat stability of the end products obtained according to Examples 4, 5 and 6 are shown in FIG. 3 of the accompanying drawing which shows logarithmic decrement and shear modulus plotted against temperature. The results were obtained using a tensile load of 0.65 kg./cm.² and a sample 8.0 mm. wide, 0.99 mm. thick and a clamping length of 40 mm.

The results from which the curves of FIG. 1 were drawn were obtained using a tensile load of 0.537 kg./cm.² and a sample 8 mm. wide and 0.88 mm. thick with a clamping length of 40 mm. and those shown in FIG. 2 were drawn from results obtained using a tensile load of 0.42 kg./cm.² and a sample 8 mm. wide, 1.13 mm. thick and a clamping length of 40 mm.

EXAMPLE 7

About 1,000 parts by weight of a dehydrate linear hydroxylpolycaprolactone prepared from epsilon - methyl-epsilon caprolactone and diethylene glycol with a molecular weight of about 2,000, a hydoxyl number of about 56 and acid number of about zero are mixed at about 110° C. with about 325 parts by weight 1,4-butanediol and about 17 parts by weight bis-(2,6-diisopropylphenyl) carbodiimide to form a substantially anhydrous mixture. This mixture is then mixed at about 82° C. with about 1,100 parts by weight finely crystalline diphenylmethane-4,4'-diisocyanate. After stirring for about two minutes, the partially reacted mixture is spread over the surface of a heated plate while still liquid to form a thin layer where it remains for about six to ten minutes at about 115° C. to about 120° C. to form a substantially nonporous solid product which can be thermoplastically processed. It is then cut into strips and removed from the plate. After four days' storage at room temperature (about 20° C.), the solid reaction product is comminuted by grinding. It is then injection-molded using conventional apparatus to form a product having a hardness of Shore D 64°.

EXAMPLE 8

The same as Example 7 except that about 357 parts by weight, 1,4-butanediol and about 1,200 parts by weight finely crystalline diphenylmethane-4,4'-diisocyanate are used. After solidification the reaction product is comminuted by grinding.

EXAMPLE 9

The same as Example 7 except that about 389 parts by weight 1,4-butanediol and about 1,300 parts by weight finely crystalline diphenylmethane-4,4'-diisocyanate are used. After solidification of the melt, the reaction product is fed into a calendar and processed into a film.

EXAMPLE 10

The same as Example 7 except that about 421 parts by weight 1,4-butanediol and about 1,400 parts by weight finely crystalline diphenylmethane-4,4'-diisocyanate are used. The solidified melt dissolves in dimethyl formamide to form a low viscosity stable solution having substantially the same viscosity after several days storage of the melt as the viscosity of a similar solution prepared after only one day storage.

EXAMPLE 11

The same as Example 7 except that about 487 parts by weight 1,4-butanediol and about 1,600 parts by weight finely crystalline diphenylmethane-4,4'-diisocyanate are used. The resulting product is compression molded, extruded or otherwise processed by thermoplastic methods.

EXAMPLE 12

The same as Example 7 except about 424 parts by weight 1,4-butanediol and about 940.8 parts 1,6-hexamethylene diisocyanate are used. The butanediol is added to the polycaprolactone at about 150° C. and the diisocyanate is mixed with the resulting mixture at about 115° C. The product is injection-molded to form a product having a hardness of Shore D 64°.

EXAMPLE 13

About 1,000 parts by weight of a substantially linear hydroxyl polycaprolactone like that of Example 7 except that it has a molecular weight of about 1,280, a hydroxyl number of about 87/88 and an acid number of about zero are mixed while substantially anhydrous with about 324 parts by weight 1,4-butanediol and about 17 parts of the carbodiimide of Example 7 at about 105° C. The resulting mixture is mixed and reacted with about 1,170 parts by weight finely crystalline diphenylmethane-4,4-diisocyanate at about 86° C. and further processed like Example 7.

The elastomers prepared by Examples 7 through 13 have the following properties.

QUALITY: CAPROLAN TN 65–CH

| Type of Test | Examples | | | | | |
|---|---|---|---|---|---|---|
| | 7 and 12 | 8 | 9 | 10 | 11 | 13 |
| Shore D | 64 | 66 | 68 | 70 | 72 | 74 |
| Tensile strength, kp./cm.² | 450 | 450 | 400 | 350 | 350 | 350 |
| Elongation at break, percent | 400 | 400 | 350 | 350 | 350 | 250 |
| Tear Strength, kp./cm | 170 | 180 | 190 | 195 | 200 | 205 |

Tensile strain rate: 100 mm./min.
Standard testpiece I.

EXAMPLE 14

About 1,000 parts by weight of a substantially anhydrous linear hydroxyl polycaprolactone prepared from epsilon-methyl-epsilon-caprolactone and diethylene glycol with a molecular weight of about 2,000 and a hydroxyl number of about 56 are mixed at about 105° C. with about 220 parts by weight 1,4-butanediol and about 17 parts by weight bis-(2,6-diisopropylphenyl) carbodiimide to form a substantially anhydrous mixture. This mixture is then mixed at about 85° C. with about 800 parts by weight finely crystalline diphenylmethane - 4,4 - diisocyanate. After stirring for about two minutes, the partially reacted mixture is spread over the surface of a heated tray while still liquid to form a thin layer where it remains for about six minutes at about 115° C. to about 120° C. to form a substantially non-porous product which can be thermoplastically processed. It is then cut into strips and removed from the tray. After four days' storage at room temperature (about 20° C.) the solid reaction product is comminuted by grinding. It is then extruded, compression molded or processed by other thermoplastic shaping methods using conventional apparatus for thermoplastic shaping.

EXAMPLE 15

About 1,000 parts by weight of a substantially anhydrous linear hydroxyl polycaprolactone prepared from epsiloncaprolactone and diethylene glycol and having a molecular weight of about 1,280 and a hydroxyl number of about 87–88 are mixed at about 105° C. with about 220 parts by weight 1,4-butanediol and about 17 parts by weight of a hydrolysis inhibitor, bis-(2,6-diisopropylphenyl) carbodiimide. The resulting substantially anhydrous mixture is mixed with about 870 parts by weight finely crystalline diphenylmethane - 4,4' - diisocyanate at about 88° C. and stirred about two minutes. The partial reaction product is then poured in a thin layer over the surface of a heated sheet where it remains at about 115° C. to about 120° C. for about six minutes. It is then cut into strips and removed from the sheet. It is stored at about 20° C. for about four days and comminuted by grinding.

The following physical properties were determined on the products of Examples 14 and 15 after thermoplastic processing.

| Example | 14 | 15 |
|---|---|---|
| Density, g./cm.$^3$ | 1.19 | 1.2 |
| Shore D Hardness, degrees | $^1$52 | $^1$56 |
| Tensile Strength, kp./cm.$^2$ | 407 | 460 |
| Elongation, percent | 600 | 600 |
| Impact Elasticity, percent | 35 | 32 |
| Tear Strength, kp./cm.$^2$ | 110 | 130 |
| Abrasion Resistance, mm.$^3$ | 63 | 85 |
| Compression Strength, percent: | | |
| 20° C | 28 | 19 |
| 70° C | 47 | 45 |
| Tensile Strength after 8 days storage in water at 80° C., kp./cm.$^2$ | 575 | 430 |

$^1$ Number of Standard Test procedures of West Germany similar to ASTM in the United States.

EXAMPLE 16

About 1,000 parts by weight of a substantially anhydrous linear hydroxyl polycaprolactone prepared from epsilon-methyl-epsilon-caprolactone and diethylene glycol with a molecular weight of about 2,000 and a hydroxyl number of about 56 are mixed at about 160° C. with about 68 parts by weight hydroquinone diglycol ether and about 2 parts by weight trimethylol propane and are reacted at about 152° C. with about 194.1 parts by weight 1,6-hexamethylene diisocyanate under substantially anhydrous conditions. The partially reacted mixture is spread over the surface of a heated tray after about 2–3 minutes while still liquid to form a thin layer where it remains for about ten minutes at about 150° C. to form a substantially non-porous product which will soften and flow under heat and pressure. It is then cut into strips and removed from the tray. After storage at room temperature (about 20° C.) for about 48 hours, the solid reaction product is comminuted by grinding to form a granulate. It is then processed in an ordinary injection-molding machine, extruder or calender. Finally, the finished parts may be annealed for about three days at 80° C. or stored for six weeks at about 20° C. to develop optimum physical properties.

EXAMPLE 17

About 1,000 parts by weight of a substantially anhydrous linear hydroxyl polycaprolactone prepared from epsilon-caprolactone and diethylene glycol and having a molecular weight of about 1,250 and a hydroxyl number of about 89 are mixed at about 150° C. with about 235 parts by weight 1,6-hexamethylene diisocyanate. Immediately thereafter, about 68 parts by weight hydroquinone diglycol ether and about 2 parts by weight trimethylol propane are stirred into the reaction mixture at about 160° C. and the resulting mixture is reacted under substantially anhydrous conditions for about 2–3 minutes. The partially reacted mixture is then poured while still liquid in a thin layer over the surface of a heated sheet where it remains at about 150° C. for about ten minutes. It is then cut into strips and removed from the sheet. After about 48 hours storage at about 20° C. it is extruded to form a filament which is cut into lengths. The resulting pellets can be compression molded, extruded or similarly processed.

The following physical properties were determined on the products of Examples 16 and 17 after thermoplastic processing:

| Example | 16 | 17 |
|---|---|---|
| Density, g./cm.$^2$ | 1.13 | 1.13 |
| Shore A Hardness, degrees | 80 | 80 |
| Tensile Strength, kp./cm.$^2$ | 370 | 380 |
| 100% Modulus, kp./cm.$^2$ | 50 | 55 |
| 300% Modulus, kp./cm.$^2$ | 70 | 75 |
| Elongation, percent | 850 | 800 |
| Impact Elasticity, percent | 55 | 50 |
| Tear Strength, kp./cm. (DIN 5307) | 35 | 40 |
| Tear Strength, kp./cm. (DIN 5315) | 60 | 65 |
| Abrasion Resistance, mm.$^3$ | 40 | 45 |
| Compression Strength, percent: | | |
| 20° C | 20 | 20 |
| 70° C | 30 | 35 |
| Heat Resistance read from Figures 4 and 5, ° C | 110 | 120 |
| Low Temperature resistance read from Figures 4 and 5, ° C | −50 | −40 |

The particular polycaprolactones and chain extenders used in the foregoing examples are preferred but any others disclosed herein as suitable can be substituted for those used. Likewise, reaction conditions and times can be varied as indicated herein. Although a substantially linear polyurethane is prepared in accordance with this invention, a small amount of trihydric alcohol is added in some preferred embodiments as shown in Examples 16 and 17. Glycerine, trimethylol ethane, trimethylol butane, hexane triol and similar alcohols can be used instead of the trimethylol propane of the examples. The amount of trihydric alcohol used will vary but will usually be not more than about 5% by weight of the glycol chain extender. Less than 1% by weight based on the weight of glycol chain extender is seldom used because it has little effect on the product.

Figure 4:
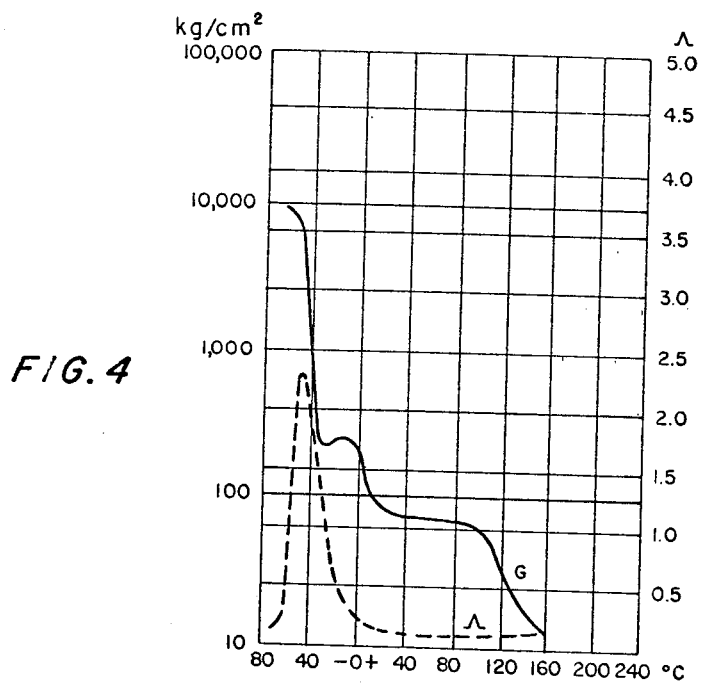
FIG. 4 illustrates graphically the mechanical-thermal behavior of a preferred embodiment of this invention.
Figure 5:
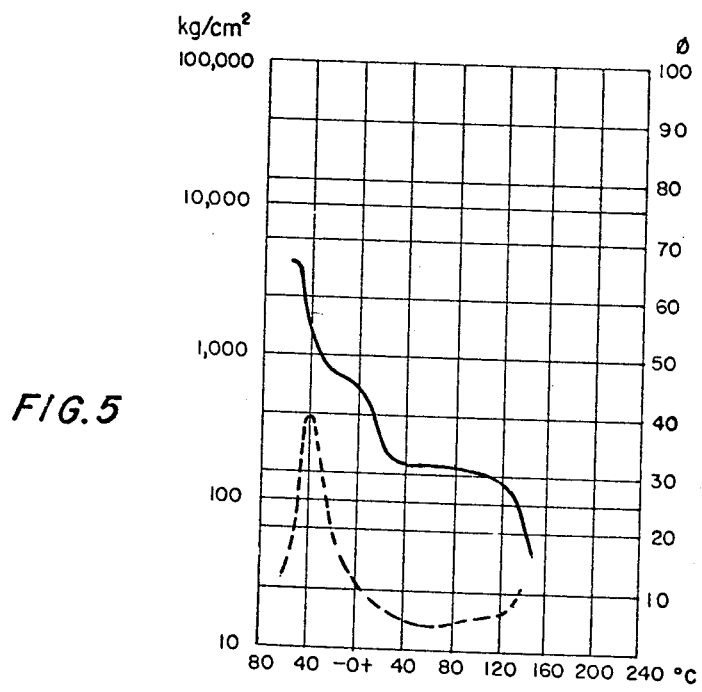
FIG. 5 illustrates graphically the mechanical-thermal behavior of another preferred embodiment of this invention.

The curves in FIGS. 4 and 5 represent the mechanical-thermal behavior of products prepared by the processes of Examples 16 and 17, respectively. The curves of FIG. 4 were determined in accordance with DIN 53,513. Referring now to the solid line curve (G) of FIG. 4, it will be noted that the radius of the curve extending from 80° C. to the right in the figure changes at about 120° C. It has been found that the product is heat resistant from this point back to the left to the approximate midpoint of the curve determined by the aforesaid radius, or in other words about 110° C. If the solid line curve of FIG. 4 is followed to the left it will be seen that at about −40° C. the line slopes sharply upwardly. The hardening point begins here and extends to the midpoint of the sharp incline or from about −40° C. to about −50° C.

The tests made to obtain the physical test data used to plot the curves of FIG. 4 were determinations of free torsional vibrations. Logarithmic decrement and shear modulus vs. temperature. Material: No. 30TN66–EH170AK, tensile load; 0.46 kp./cm.$^2$. Testpiece: b=8.0 mm., h=1.02 mm. clamped length=40 mm. Ordinate: shear modulus G.

FIG. 5—Determination of dynamic modulus of relative damping in accordance with DIN 53,513. Quality: TN66–EH170AK MG1250, Testing machine KKC3. Test Type: tensile; frequency; Shore A=80. Ordinate (left); E modulus; (right): Relative damping.

The physical tests used to determine physical properties of the thermoplastically processed product of each of the examples were as follows:

| | DIN [1] |
|---|---|
| Hardness | 53,505 |
| Tensile strength and modulus and elongation at break | 53,504 |
| Resistance to tear propagation | 53,507 and 53,515 |
| Abrasion loss | 53,516 |
| Deformation under load (compression set) | 53,517 |
| Density | 53,550 |
| Impact elasticity | 53,512 |
| Abrasion | 53,516 |

[1] Standard Test Procedure used in West Germany—similar to U.S. ASTM.

Although the invention has been described in detail for the purpose of illustration, it is to be understood that variations can be made by those skilled in the art without departing from the spirit and scope of the invention.

I claim:

1. A thermoplastically processable polyurethane prepared by a process which comprises reacting a substantially linear hydroxyl polycaprolactone having a molecular weight above about 800, a low molecular weight glycol having hydroxyl groups as the only groups reactive with an —NCO group and an organic diisocyanate, transferring the resulting mixture while still pourable to a surface, heating the resulting layer until solidification thereof and cooling the resulting product below a temperature where significant chemical reaction will occur after solidification but before it is no longer processable by thermoplastic methods.

2. The product of claim 1 wherein the said resulting mixture is poured over a heated surface.

3. The product of claim 1 wherein the low molecular weight glycol has the formula $$HO(C_nH_{2n})O—R—O(C_nH_{2n})OH$$

wherein R is phenylene or naphthylene and $n$ is an integer of from 1 to 12.

4. The product of claim 1 wherein the diisocyanate is diphenylmethane-4,4'-diisocyanate.

5. The product of claim 3 wherein the hydroxyl polycaprolactone has a molecular weight of from about 1000 to about 3000 and the diisocyanate is 1,6-hexamethylene diisocyanate.

6. The product of claim 1 wherein the diisocyanate is mixed with the polycaprolactone as particles of solid diphenylmethane-4,4'-diisocyanate, the hydroxyl polycaprolactone has a molecular weight of from about 1000 to about 3000 and the low molecular weight glycol has a molecular weight below about 560.

7. The product of claim 1 having a hardness of above Shore D 60° wherein the hydroxyl polycaprolactone has a molecular weight of from about 1000 to about 3000, the diisocyanate is diphenylmethane-4,4'-diisocyanate mixed with the other said reactants as solid particles thereof or 1,6-hexamethylene diisocyanate and the ratio of —NCO groups to total —OH groups is from about 1.06 to about 1.09 —NCO groups per —OH group.

8. The product of claim 7 wherein the ratio of —NCO groups to —OH groups of the said glycol is from about 1.1 to about 1.3 —NCO per —OH.

9. The product of claim 8 wherein the glycol is 1,4-butanediol.

10. The product of claim 2 wherein the low molecular weight glycol is hydroquinone diglycol ether.

11. A process for making a thermoplastically processable polyurethane which comprises mixing a substantially linear hydroxyl polycaprolactone having a molecular weight above about 800, an organic diisocyanate and a low molecular weight glycol having hydroxyl groups as the only groups reactive with an —NCO group, transferring the resulting mixture while still pourable to a surface, heating the mixture on the surface until after solidification, and cooling the resulting product below a temperature where any significant chemical reaction will occur after solidification but before it is no longer processable by thermoplastic methods.

12. The process of claim 11 wherein the low molecular weight glycol has the formula $$HO(C_nH_{2n})O—R—O(C_nH_{2n})OH$$

wherein R is phenylene or naphthylene and $n$ is an integer of from 1 to 12.

13. The process of claim 12 wherein the low molecular weight glycol is hydroquinone diglycol ether.

14. The process of claim 11 wherein the diisocyanate is mixed with the other said reactants as particles of solid diphenylmethane-4,4'-diisocyanate and the hydroxyl polycaprolactone has a molecular weight of from about 1000 to about 3000.

15. The process of claim 12 wherein the hydroxyl polycaprolactone has a molecular weight of from about 1000 to about 3000 and the diisocyanate is 1,6-hexamethylene diisocyanate.

16. The process of claim 11 wherein the hydroxyl polycaprolactone has a molecular weight of from about 1000 to about 3000, the diisocyanate is diphenylmethane-4,4'-diisocyanate mixed with the other reactants as solid particles thereof or 1,6-hexamethylene diisocyanate and the ratio of —NCO groups to total —OH groups is from about 1.06 to about 1.09 —NCO group per —OH group.

17. The process of claim 16 wherein the ratio of —NCO groups to —OH groups of the said diol is from about 1.1 to about 1.3 —NCO per —OH.

18. The process of claim 17 wherein the diol is 1,4-butanediol.

19. The process of claim 15 wherein the resulting mixture is at from about 80° C. to about 160° C. and the heated surface has a temperature of from about 140° C. to about 160° C.

20. The process of claim 15 wherein the low molecular weight glycol and up to about 5% by weight of a trihydric alcohol, based on the weight of the glycol, are chain extenders.

21. A shaped article prepared from the product of claim 1.

22. The shaped article of claim 21 wherein the shaping is done by injection molding, extruding, calendering or compression molding.

References Cited

UNITED STATES PATENTS

| 2,933,477 | 4/1960 | Hostettler et al. | 260—77.5 |
| 2,933,478 | 4/1960 | Young et al. | 260—77.5 |
| 3,051,687 | 8/1962 | Young et al. | 260—77.5 |

WILLIAM H. SHORT, Primary Examiner

L. L. LEE, Assistant Examiner

U.S. Cl. X.R.

260—32.6, 37, 77.5